(12) United States Patent
Lee et al.

(10) Patent No.: US 12,638,707 B2
(45) Date of Patent: May 26, 2026

(54) ELECTRONIC DEVICE

(71) Applicant: InnoLux Corporation, Miao-Li County (TW)

(72) Inventors: Yi-Hui Lee, Miao-Li County (TW); Kuan-Chou Chen, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 162 days.

(21) Appl. No.: 18/583,409

(22) Filed: Feb. 21, 2024

(65) Prior Publication Data

US 2024/0319529 A1     Sep. 26, 2024

Related U.S. Application Data

(60) Provisional application No. 63/453,655, filed on Mar. 21, 2023.

(30) Foreign Application Priority Data

Sep. 21, 2023    (CN) .......................... 202311222266.6

(51) Int. Cl.
*G02F 1/1333*          (2006.01)
(52) U.S. Cl.
CPC .. *G02F 1/133354* (2021.01); *G02F 1/133325* (2021.01)
(58) Field of Classification Search
CPC ........................ G02F 1/133354; G02F 1/33325
See application file for complete search history.

(56) References Cited

U.S. PATENT DOCUMENTS

| | | | | | |
|---|---|---|---|---|---|
| 4,832,455 | A | * | 5/1989 | Takeno | H05K 3/323 |
| | | | | | 349/149 |
| 7,911,561 | B2 | * | 3/2011 | Seok | G02F 1/1347 |
| | | | | | 349/187 |
| 2012/0044345 | A1 | * | 2/2012 | Liu | G02F 1/1303 |
| | | | | | 348/95 |

(Continued)

FOREIGN PATENT DOCUMENTS

| | | | | | |
|---|---|---|---|---|---|
| CN | | 1064457 | C | * | 4/2001 ........... G02F 1/1345 |
| CN | | 113808477 | A | | 12/2021 |

(Continued)

OTHER PUBLICATIONS

Machine translation CN11064457C (Year: 2001).*

(Continued)

*Primary Examiner* — Abbas Rashid
*Assistant Examiner* — Wayne K. Swier
(74) *Attorney, Agent, or Firm* — MUNCY, GEISSLER, OLDS & LOWE, P.C.

(57) ABSTRACT

An electronic device includes: a first panel, a second panel, and a first adhesive member. The first panel includes a fist alignment mark. The second panel is disposed on the first panel, and includes a second alignment mark. The first adhesive member is disposed between the first panel and the second panel, and in a top view of the electronic device, a first distance is between the first adhesive member and the first alignment mark, a second distance is between the first adhesive member and the second alignment mark, the first distance is greater than zero, and the second distance is greater than zero.

15 Claims, 9 Drawing Sheets

(56)        References Cited

U.S. PATENT DOCUMENTS

2023/0029555 A1* 2/2023 You ....................... G02F 1/1303

FOREIGN PATENT DOCUMENTS

| | | | | | |
|---|---|---|---|---|---|
| KR | 101403567 | B1 | * | 6/2014 | ....... G02F 1/133512 |
| KR | 20230028628 | A | * | 3/2023 | ........... G02F 1/1345 |
| TW | 1644145 | B | * | 12/2018 | ........... G02F 1/1303 |
| TW | 201910875 | A | | 3/2019 | |

OTHER PUBLICATIONS

Machine translation KR101403567B1 (Year: 2014).*
Machine translation TWI644145B (Year: 2018).*
Machine translation CN113808477A (Year: 2021).*
Machine translation KR20230028628A (Year: 2023).*

* cited by examiner

S81

S82

S83

S84

S85

S91

S92

S93

S94

S95

ELECTRONIC DEVICE

CROSS-REFERENCE TO RELATED APPLICATIONS

This application claims the benefit of filing date of U.S. Provisional Application Ser. No. 63/453,655 filed on Mar. 21, 2023 under 35 USC § 119(e)(1), and also claims the benefit of the Chinese Patent Application Serial Number 202311222266.6, filed on Sep. 21, 2023, the subject matters of which are incorporated herein by reference.

BACKGROUND

Field of the Disclosure

The present disclosure relates to adhering technology for multiple panels of an electronic device.

Description of Related Art

Nowadays, various electronic devices are provided with displays, and electronic devices are developed toward energy saving or low power consumption requirements, for example, reflective displays or transflective displays that are capable of saving power consumption. In response to market demand, the electronic device may include multiple panels that are adhered to each other. Currently, when multiple panels are to be adhered, the panels are usually aligned in an atmospheric environment, and then adhered and assembled in a vacuum environment. However, when switching from an atmospheric environment to a vacuum environment, there may be offset generated between the panels due to changes in pressure, resulting in poor accuracy in adhering and assembly.

Therefore, it is desired to provide an improved electronic device and manufacturing method thereof so as to mitigate and/or obviate the aforementioned problems.

SUMMARY

The present disclosure provides an electronic device, which comprises: a first panel including a first alignment mark; a second panel disposed on the first panel and provided with at least one second alignment mark; and a first adhesive member disposed between the first panel and the second panel, wherein, in a direction of overlooking the electronic device, the first adhesive member and the first alignment mark are spaced apart by a first distance, and the first adhesive member and the at least one second alignment mark are spaced apart by a second distance, where the first distance is greater than zero, and the second distance is greater than zero.

The present disclosure also provides a manufacturing method of electronic device, which comprises the steps of: providing a first panel having a first alignment mark and a second panel having at least one second alignment mark; and aligning the first alignment mark and the at least one second alignment mark under a vacuum environment of lower than 700 Pa, and adhering the first panel and the second panel through a first adhesive member, wherein, in a direction of overlooking the electronic device, the first adhesive member and the first alignment mark are spaced apart by a first distance, and the first adhesive member and the at least one second alignment mark are spaced apart by a second distance between, where the first distance is greater than zero, and the second distance is greater than zero.

Other novel features of the disclosure will become more apparent from the following detailed description when taken in conjunction with the accompanying drawings.

DETAILED DESCRIPTION OF EMBODIMENT

Figure 1:
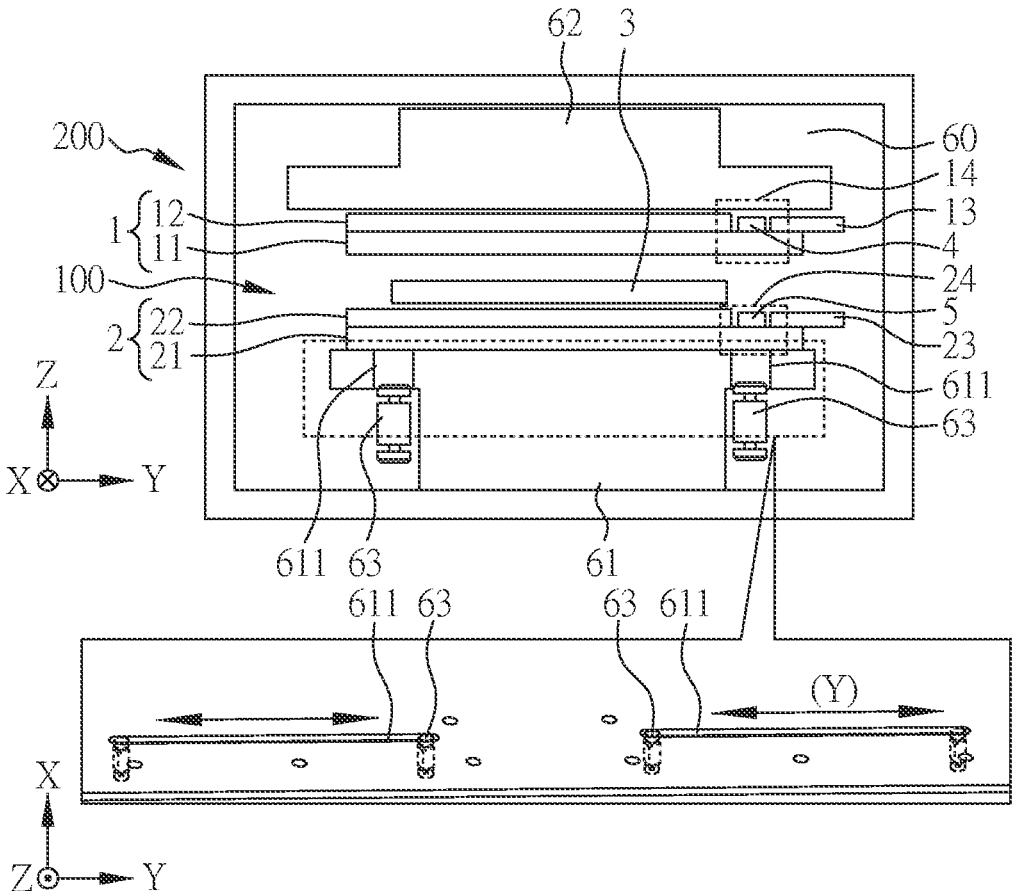
FIG. 1 is a schematic diagram of an electronic device and an assembly apparatus according to an embodiment of the present disclosure.

Reference will now be made in detail to exemplary embodiments of the present disclosure, examples of which are illustrated in the accompanying drawings. Wherever possible, the same reference numerals are used in the drawings and description to refer to the same or like parts.

Throughout the specification and the appended claims, certain terms may be used to refer to specific components. Those skilled in the art will understand that sensor device manufacturers may refer to the same components by different names. The present disclosure does not intend to distinguish between components that have the same function but have different names. In the following description and claims, words such as "containing" and "comprising" are open-ended words, and should be interpreted as meaning "including but not limited to".

Directional terms mentioned in the specification, such as "up", "down", "front", "rear", "left", "right", etc., only refer to the directions of the drawings. Accordingly, the directional term used is illustrative, not limiting, of the present disclosure. In the drawings, various figures illustrate the general characteristics of methods, structures and/or materials used in particular embodiments. However, these drawings should not be construed to define or limit the scope or nature encompassed by these embodiments. For example, the relative sizes, thicknesses and positions of various layers, regions and/or structures may be reduced or enlarged for clarity.

One structure (or layer, component, substrate) described in the present disclosure is disposed on/above another structure (or layer, component, substrate), which can mean that the two structures are adjacent and directly connected, or can refer to two structures that are adjacent rather than directly connected. Indirect connection means that there is at least one intermediate structure (or intermediate layer, intermediate component, intermediate substrate, intermediate space) between the two structures, the lower surface of one structure is adjacent to or directly connected to the upper surface of the intermediate structure, and the upper surface of the other structure is adjacent to or directly connected to the lower surface of the intermediate structure. The intermediate structure may be a single-layer or multi-layer physical structure or a non-physical structure, which is not limited. In the present disclosure, when a certain structure is arranged "on" other structures, it may mean that a certain structure is "directly" on other structures, or it means that a certain structure is "indirectly" on other structures; that is, at least one structure is sandwiched, in between a certain structure and other structures.

The terms, such as "about", "equal to", "equal" or "same", "substantially", or "substantially", are generally interpreted as within 20% of a given value or range, or as within 10%, 5%, 3%, 2%, 1%, or 0.5% of a given value or range.

Furthermore, any two values or directions used for comparison may have certain errors. If the first value is equal to the second value, it implies that there may be an error of about 10% between the first value and the second value. If the first direction is perpendicular or "substantially" perpendicular to the second direction, the angle between the first direction and the second direction may be between 80 degrees and 100 degrees. If the first direction is parallel or "substantially" parallel to the second direction, the angle between the first direction and the second direction may be between 0 degrees and 10 degrees.

In the specification and claims, unless otherwise specified, ordinal numbers, such as "first" and "second", used herein are intended to distinguish elements rather than disclose explicitly or implicitly that names of the elements bear the wording of the ordinal numbers. The ordinal numbers do not imply what order an element and another element are in terms of space, time or steps of a manufacturing method. Thus, what is referred to as a "first element" in the specification may be referred to as a "second element" in the claims.

Furthermore, the term "a given range is from a first value to a second value" or "a given range is within a range from the first value to the second value" means that the given range includes the first value, the second value and other values therebetween.

It should be understood that, according to the disclosed embodiments, an optical microscope (OM), a scanning electron microscope (SEM), a film thickness profilometer (α-step), an ellipsometer thickness gauge, or other suitable means may be used to measure the depth, thickness, width or height of each component, or the spacing or distance between components. According to some embodiments, a scanning electron microscope may be used to obtain a cross-sectional structure image including the components to be measured, and measure the depth, thickness, width or height of each component, or the spacing or distance between components.

In addition, the sensing device disclosed in the present disclosure may be applied to electronic devices. The electronic devices may include imaging devices, adhering devices, display devices, backlight devices, antenna devices, tiled devices, touch display devices, curved displays or free shape displays, but not limited thereto. The electronic device may include, for example, liquid crystal, light emitting diode, fluorescence, phosphor, other suitable display media, or a combination thereof, but not limited thereto. The display device may be a non-self-luminous display device or a self-luminous display device. The antenna device may be a liquid crystal type antenna device or a non-liquid crystal type antenna device, and the sensing device may be such a sensing device that senses capacitance, light, heat energy or ultrasonic waves, but not limited thereto. The tiled device may be, for example, a display tiled device or an antenna tiled device, but not limited thereto. It is noted that the electronic device may be any combination of the above, but not limited thereto. The electronic device may be a bendable or flexible electronic device. It is noted that the electronic device may be any combination of the above, but not limited thereto. In addition, the shape of the electronic device may be a rectangular shape, a circular shape, a polygonal shape, a shape with curved edges, or other suitable shapes. The electronic device may have peripheral systems such as a driving system, a control system, a light source system, a shelf system, etc. so as to support the display device, antenna device or tiled device.

It should be noted that the following embodiments may be replaced, reorganized, and mixed to complete other embodiments without departing from the spirit of the present disclosure. As long as the features of the various embodiments do not violate the spirit of the invention or conflict with each other, they can be mixed and matched arbitrarily.

Unless otherwise defined, all terms (including technical and scientific terms) used herein have the same meaning as commonly understood by one of ordinary skill in the art to which this disclosure belongs. It may be understood that these terms, such as those defined in commonly used dictionaries, should be interpreted as having meanings consistent with the background or context of the related technology and the present disclosure, and should not be interpreted in an idealized or overly formal manner, unless otherwise specified in the embodiments of the present disclosure.

In addition, the term "adjacent" in the specification and claims is used to describe mutual proximity, and does not necessarily mean mutual contact.

In addition, the descriptions such as "when" or "during" in the present disclosure represent aspects such as "now, before or after", and are not limited to situations that occur at the same time, which is described first here. In the present disclosure, similar descriptions such as "arranged on" refer to the corresponding positional relationship between the two components, and do not limit whether there is contact between the two components, unless otherwise specified, which is described here first. Furthermore, when the present disclosure discloses multiple functions, if the word "or" is used between the functions, it means that the functions may exist independently, but it does not exclude that multiple functions may exist simultaneously.

In addition, the terms such as "electrically connected" or "coupled" in the specification and claims not only refer to a direct electrical connection with another component, but also refer to an indirect electrical connection with another component. The electrical connection includes direct electrical connection, indirect electrical connection, or communication between two components through wireless signals.

In the present disclosure, when "or" is used as a connective word between multiple elements, unless otherwise stated, the expressions of "and" and "or" are included.

In the present disclosure, the expression "a certain element is disposed on another element" means that the certain element may be disposed on a certain side of another element, such as but not limited to top side, bottom side, left side, right side, front side or back side, while it is not necessary to have a contact between the two.

FIG. 1 is a schematic diagram of an electronic device 100 and an assembly apparatus 200 according to an embodiment of the present disclosure, which is used to show the implementation aspect of the electronic device 100 and the assembly device 200 of the present disclosure.

As shown in FIG. 1, the electronic device 100 includes a first panel 1, a second panel 2 and a first adhesive member 3. The first panel 1 may include a first alignment mark 4. The second panel 2 may include at least one second alignment mark 5. The first panel 1 and the second panel 2 may be arranged correspondingly. For example, the second panel 2 may be arranged on the first panel 1, while it is not limited thereto. The first adhesive member 3 may be disposed or adhered between the first panel 1 and the second panel 2. For example, when the electronic device 100 is finished with adhering, the first adhesive member 3 may be disposed or adhered between the first panel 1 and the second panel 2. The first alignment mark 4 may be used for alignment with the at least one second alignment mark 5. The assembly apparatus 200 is used to make the first panel 1 and the second panel 2 adhered together.

In one embodiment, the first panel 1 further includes a first substrate 11, a second substrate 12 and a first control element 13. The first substrate 1 is, for example, disposed opposite to the second substrate 12. A color filter (not shown) may be selectively provided on one of the first substrate 11 and the second substrate 12. The first alignment mark 4 is, for example, disposed on the first substrate 11, and its projection in the direction of overlooking the electronic device (hereinafter referred to as the Z direction or top view direction) may, for example, not overlap the second substrate 12. The first control element 13 may be disposed on the first substrate 11, and its projection in the direction of overlooking the electronic device (Z direction) may, for example, not overlap the second substrate 12. In addition, the second panel 2 also includes a third substrate 21, a fourth substrate 22 and a second control element 23. For example, the third substrate 21 is disposed opposite to the fourth substrate 22. A color filter (not shown) may be selectively provided on one of the third substrate 21 and the fourth substrate 22. At least one second alignment mark 5 is, for example, disposed on the third substrate 21, and its projection in the direction of overlooking the electronic device (Z direction) may, for example, not overlap the fourth substrate 22. The second control element 23 may be disposed on the third substrate 21, and its projection in the direction of overlooking the electronic device (Z direction) may, for example, not overlap the fourth substrate 22.

The assembly apparatus 200 may include a chamber 60, a first carrier platform 61, a second carrier platform 62 and at least one detection element 63 (for example, a camera). The first carrier platform 61 and the second carrier platform 62 may be disposed in the chamber 60 and, in the Z direction, the first carrier platform 61 and the second carrier platform 62 may be arranged oppositely. For example, the first carrier platform 61 may be disposed at the bottom of the chamber 60, and the second carrier platform 62 may be disposed above the first carrier platform 61, but it is not limited thereto. The chamber 60 may be used to provide a vacuum environment, for example, it may provide a vacuum environment of lower than 700 Pa (the gas pressure of the vacuum environment 700 Pa), or it may also be regarded as lower than one atmosphere (the gas pressure of the vacuum environment ≤1 atm), but it is not limited there to. In some embodiments, the first carrier 61 can carry one of the first panel 1 and the second panel 2, and the second carrier 62 can carry the other of the first panel 1 and the second panel 2. Therefore, the first panel 1 and the second panel 2 can be bonded in a vacuum environment (for example, lower than 700 Pa). In some embodiments, the first carrier platform 61 may optionally have at least one opening 611. The opening 611 is filled with, for example, a transparent material (not shown) or air (not shown). In the Z direction, the opening 611, for example, overlaps the detection element 63. The detection element 63 is used to obtain images of the first alignment mark 4 and the at least one second alignment mark 5 so as to facilitate alignment of the first alignment mark 4 and the at least one second alignment mark 5. In some embodiments (not shown), the detection element 63 is allowed to be disposed in the opening 611, but it is not limited thereto. It is noted that the detection element 63 (for example, a camera) may be protected by other protection elements (not shown), so that the detection element 63 may still perform functions in a vacuum environment. In one embodiment, the opening 611 may extend along at least one extending direction, for example, but not limited to, the Y direction. In other embodiments (not shown), the opening 611 may extend along the X direction or other directions perpendicular to the Z direction, and the detection element 63 may move in the at least one extending direction in the opening 611, so that, when the dimensions of the panels are different, the first carrier platform may be used to carry panels of different sizes and observe the alignment marks therein, but it is not limited thereto. It is noted that, although the example of FIG. 1 shows that the first carrier platform 61 carries the second panel 2 and the second carrier platform 62 carries the first panel 1, the present disclosure is not limited thereto, while the order may be adjusted according to the needs.

Since the detection element 63 is disposed in the assembly apparatus 200, the alignment of the first panel 1 and the second panel 2 may be performed in a vacuum environment. As a result, the first panel 1 and the second panel 2 may be aligned, adhered and assembled in a vacuum environment with the same air pressure, which may reduce the probability of the first panel 1 and the second panel 2 being offset during adhering.

Figures 2A, 2B, 3A:
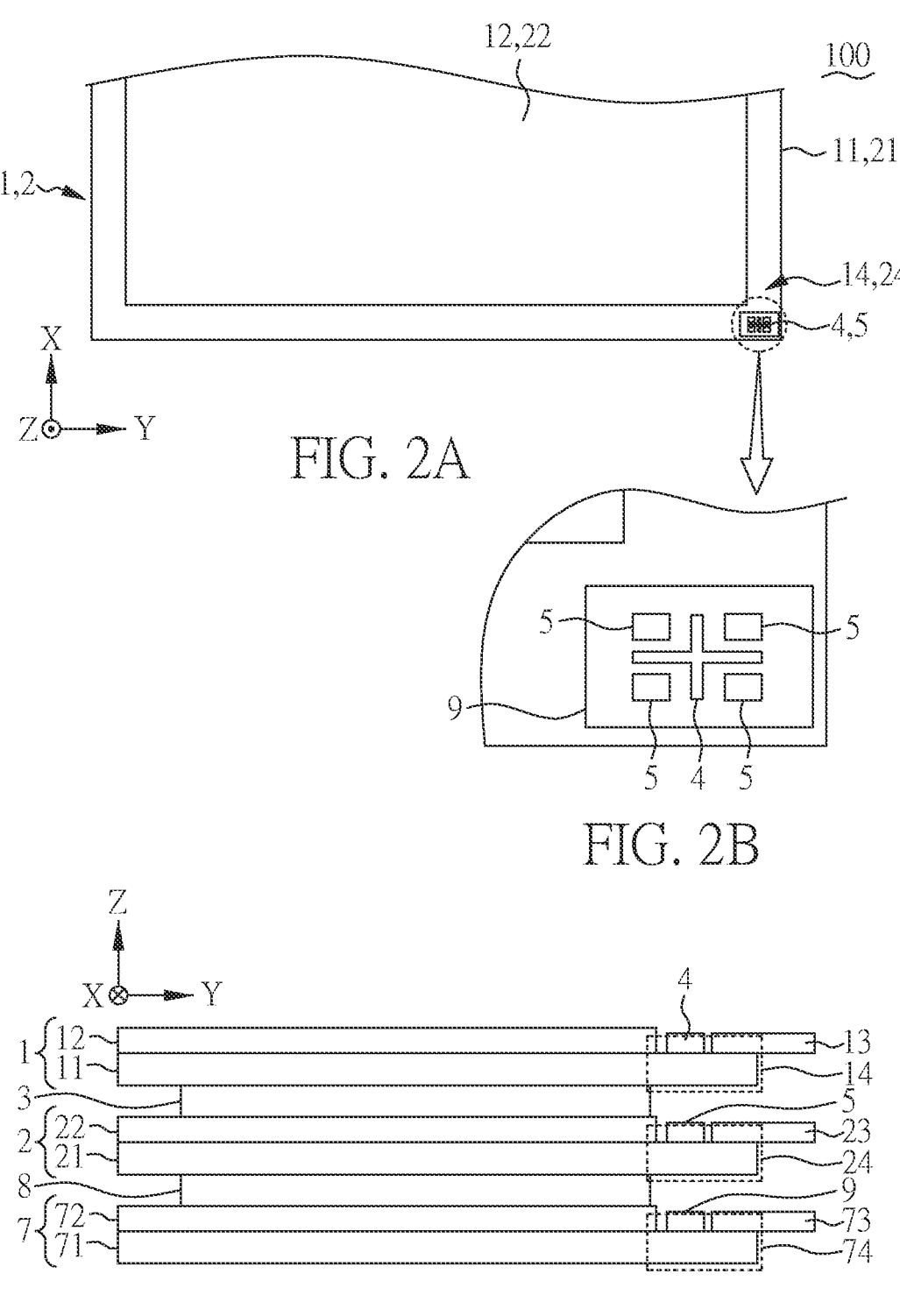
FIG. 2A is a top view of an electronic device according to an embodiment of the present disclosure.
FIG. 2B is an enlarged view of a part of FIG. 2A.
FIG. 3A is a schematic diagram of an electronic device according to another embodiment of the present disclosure.

Next, the details of each component will be described, please refer to FIG. 1 and FIGS. 2A and 2B at the same time. FIG. 2A is a top view of the electronic device 100 according to an embodiment of the present disclosure, and FIG. 2B is an enlarged view of a part of FIG. 2A.

As shown in FIGS. 2A and 2B, when the first panel 1 and the second panel 2 are adhered, the first alignment mark 4 is aligned with the at least one second alignment mark 5, and the first alignment mark 4 and the at least one second alignment mark 5 may not overlap or may partially overlap in the Z direction. The positions or shapes of the first alignment mark 4 and the at least one second alignment mark 5 may correspond to each other (for example, the shapes are complementary) so as to facilitate alignment. By taking FIGS. 2A and 2B as an example, the at least one second alignment mark 5 may include multiple sub-parts, for example, and the multiple sub-parts surround the first alignment mark 4, but it is not limited thereto. The relative shapes or positions of the first alignment mark 4 and the second alignment mark 5 may be adjusted according to needs.

Next, the details of the components of the electronic device 100 and the assembly apparatus 200 will be described. Please refer to FIG. 1 and FIGS. 2A and 2B again.

In the present disclosure, although not shown in detail in the figures, the first panel 1 or the second panel 2 may also include a display array (not shown), a display medium (not shown), a sealing member (not shown), an alignment film (not shown), a light-shielding layer (not shown), etc., while it is not limited thereto. In one embodiment, the display array of the first panel 1 or the second panel 2 may, for example, include a transistor, and the transistor may, for example, include a semiconductor layer, wherein the material of the semiconductor layer may include amorphous silicon, polycrystalline silicon or an oxide semiconductor, wherein the polycrystalline silicon may be, for example, but not limited to, low-temperature polycrystalline silicon (LTPS), and the oxide semiconductor may be, for example, but not limited to, indium gallium zinc oxide (IGZO), but it is not limited thereto. In one embodiment, the first panel 1 or the second panel 2 may be an active driving panel or a passive driving panel, for example. When the first panel 1 or the second panel 2 is, for example, a passive driving panel, there may be no transistor in the first panel 1 or the second panel 2, but it is not limited thereto. In one embodiment, the display medium of the first panel 1 or the second panel 2 may include, for example, liquid crystal, light emitting diode (LED), fluorescence, phosphor, other suitable display media, or a combination thereof, but it is not limited thereto. The liquid crystals may include, for example, cholesteric liquid crystals or other suitable liquid crystals. The light-emitting diode may include, for example, an organic light emitting diode (OLED), a sub-millimeter light-emitting diode (mini LED), a micro light-emitting diode (micro LED) or a quantum dot light-emitting diode (quantum dot LED, which may be, for example, QLED or QDLED) or other suitable materials or any arrangement and combination of the above materials, but it is not limited thereto.

In one embodiment, the first substrate 11, the second substrate 12, the third substrate 21 or the fourth substrate 22 may include a rigid substrate or a flexible substrate, and the first substrate 11, the second substrate 12, the third substrate 21 or the fourth substrate 22 may include a transparent substrate, but it is not limited thereto. The first substrate 11, the second substrate 12, the third substrate 21 or the fourth substrate 22 may include glass, quartz, sapphire, ceramics, plastic, other suitable substrate materials or a combination thereof, but it is not limited thereto. The material of the first substrate 11, the second substrate 12, the third substrate 21 or the fourth substrate 22 may include polycarbonate (PC), polyimide (PI), polypropylene (PP), polyethylene terephthalate (PET), polymethylmethacrylate (PMMA), other suitable materials or a combination thereof, but it is not limited thereto.

In some embodiments, the first control element 13 or the second control element 23 may be, for example, a driving element of the first panel 1 or the second panel 2, and may include a gate driver or a drain driver, but it is not limited thereto. In some embodiments, the first control element 13 or the second control element 23 may, for example, include a chip. In one embodiment, the first control element 13 or the second control element 23 may be arranged on the first substrate 11 or the third substrate 21 in a chip on film (COF) manner, but it is not limited thereto.

In some embodiments, the first adhesive member 3 may, for example, include an adhesive layer, the material of which may include optical clear adhesive (OCA), curing glue (for example, light-curing glue or moisture-curing glue), or other materials with similar function, while it is not limited thereto. The first adhesive member 3 may include, for example, a transparent material, but it is not limited thereto. In some embodiments, some light filtering particles may be optionally added to the first adhesive member 3 to filter out light of some wavelengths (for example, to filter out light other than blue light, yellow light, green light or red light), but it is not limited thereto.

In some embodiments, the material of the first alignment mark 4 or the at least one second alignment mark 5 may include metal, non-metal (such as black photoresist or other color photoresist) or a combination thereof, but it is not limited thereto. In some embodiments, the first alignment mark 4 or the at least one second alignment mark 5 may include non-transparent material to facilitate observation, but it is not limited thereto. In some embodiments, the first alignment mark 4 or the at least one second alignment mark 5 may, for example, include a single layer or a composite layer of material. In some embodiments, the first alignment mark 4 may be disposed in a first bonding area 14 of the first panel 1, and the at least a second alignment mark 5 may be disposed in a second bonding area 24 of the second panel 2. The first bonding area 14 may be located, for example, in a peripheral circuit area of the first substrate 11 (for example, an area not overlapping with the second substrate 12), and the second bonding area 15 may be, for example, located in a peripheral circuit area of the third substrate 22 (for example, an area not overlapping with the fourth substrate 22). The first bonding area 14 may be, for example, an outer lead bonding (OLB) area of the first panel 1, and the second bonding area 24 may be, for example, an outer lead bonding area of the second panel 2. In the direction of overlooking the electronic device (Z direction), the first bonding area 14 and the second bonding area 24 at least partially overlap. In one embodiment, at least part of the first bonding area 14 and at least part of the second bonding area 15 may include a light-transmitting area or a semi-light-transmitting area, so that the detection element 63 may obtain the images of the first alignment mark 4 and the at least one second alignment mark 5, but it is not limited thereto. In some embodiments, in the direction of overlooking the electronic device (Z direction), the first alignment mark 4 and the at least one second alignment mark 5 do not overlap with the second substrate 12 or the fourth substrate 22, so that the image obtained by the detection element 63 is made clearer, thereby improving the alignment accuracy. In one embodiment, the first alignment mark 4 or the at least one second alignment mark 5 may be provided in the first bonding area 14 or the second bonding area 15 by, for example, photolithography development, while it is not limited thereto.

In one embodiment, the detection element 63 may be, for example, a charge coupled device (CCD), which may convert the sensed image into a digital signal, but it is not limited thereto.

As a result, the details of the components of the electronic device 100 and the assembly apparatus 200 can be understood.

Figure 3B:
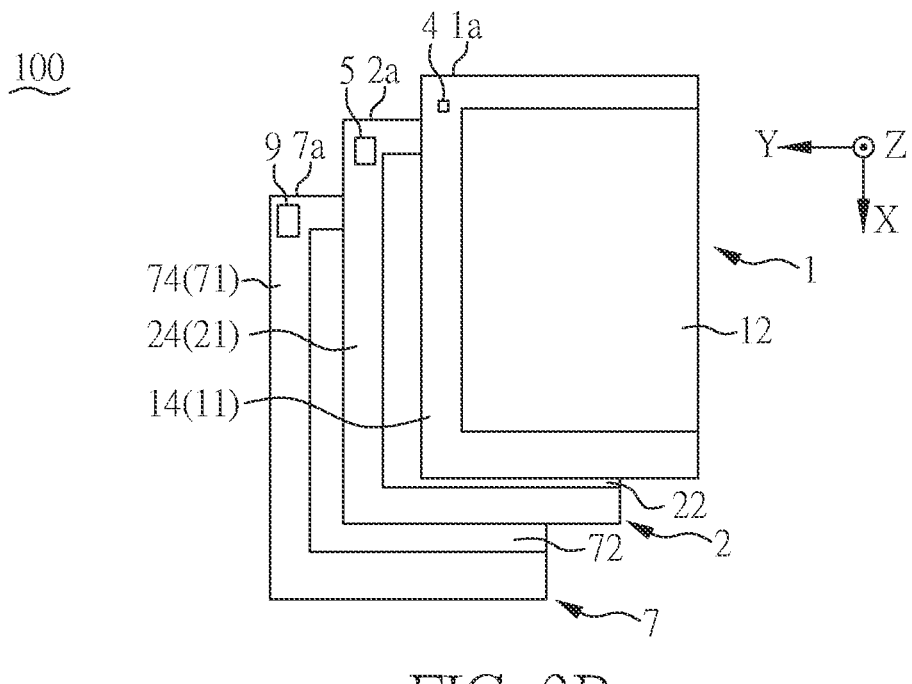
FIG. 3B is a top view of an electronic device according to another embodiment of the present disclosure.
Figure 3C:
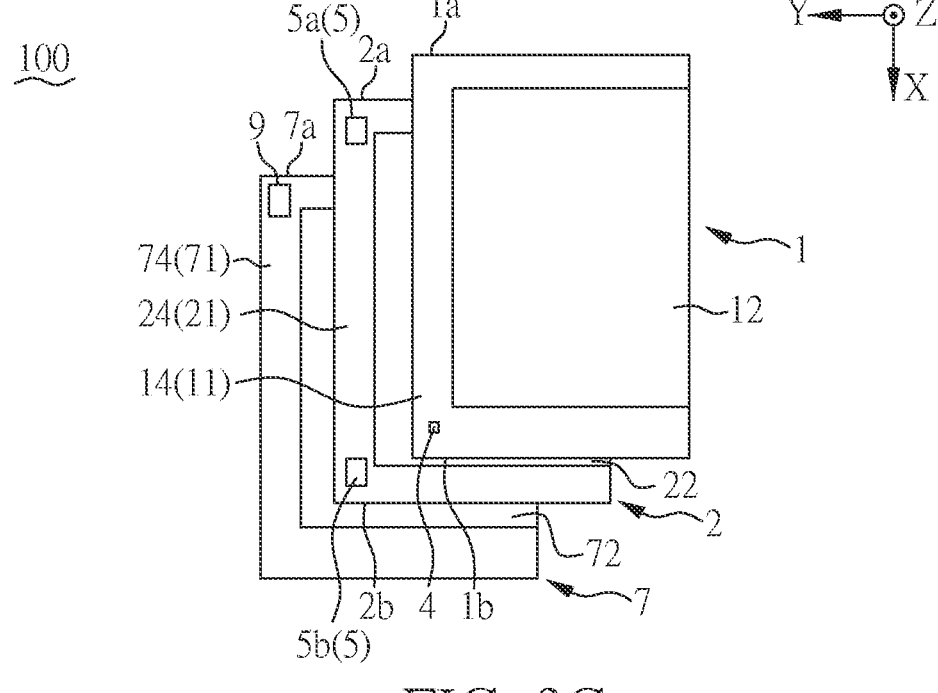
FIG. 3C is a top view of an electronic device according to another embodiment of the present disclosure.

Next, another implementation aspect of the electronic device 100 will be described. Please refer to FIGS. 3A to 3C as well as FIGS. 1 to 2 for assistance. FIG. 3A is a schematic diagram of an electronic device 100 according to another embodiment of the present disclosure, FIG. 3B is a top view of the electronic device 100 according to another embodiment of the present disclosure, and FIG. 3C is a top view of the electronic device 100 according to another embodiment of the present disclosure. The description of the embodiment in FIG. 1 or FIGS. 2A and 2B may be applicable to some features of the embodiment in FIG. 3A to FIG. 3C, and thus the differences will be mainly described below.

As shown in FIG. 3A, the electronic device 100 may further include a third panel 7 and a second adhesive member 8, and the third panel 7 may include a third alignment mark 9. In one embodiment, the third panel 7 further includes a fifth substrate 71, a sixth substrate 72 and a third control element 73. For example, the fifth substrate 71 is disposed opposite to the sixth substrate 72. A color filter (not shown) may be optionally provided on at least one of the fifth substrate 71 and the sixth substrate 72. The third alignment mark 9 is, for example, disposed on the fifth substrate 71 and, in the direction of overlooking the electronic device (Z direction), the third alignment mark 9 may not overlap the sixth substrate 72, for example. The third control element 73 may be disposed on the fifth substrate 71 and, in the direction of overlooking the electronic device (Z direction), the third control element 73 may not overlap the sixth substrate 72, for example.

The description of the first panel 1 or the second panel 2 may generally be applicable to various components, detailed features, or materials of the third panel 7, and thus the following description mainly focuses on the differences.

In the Z direction, the third panel 7 may be disposed under the second panel 2. For example, in the Z direction, the second panel 2 may be disposed between the first panel 1 and the third panel 7, but it is not limited thereto. The second adhesive member 8 may be disposed between the second panel 2 and the third panel 7. For example, when the electronic device 100 is finished with adhering, the second adhesive member 8 may be disposed or adhered between the second panel 2 and the third panel 7. The at least one second alignment mark 5 may be used to align with the first alignment mark 4 and/or the third alignment mark 9. In the normal direction (Z direction) of the electronic device 100, the at least one second alignment mark 5 may be disposed between the first alignment mark 4 and the third alignment mark 9, but it is not limited thereto.

In one embodiment, the third alignment mark 9 may be disposed in a third bonding area 74 of the third panel 7. The third bonding area 74 may be located, for example, in a peripheral circuit area of the fifth substrate 71 (for example, an area where the fifth substrate 71 does not overlap the sixth substrate 72). In one embodiment, the third bonding area 74 may be, for example, an outer pin bonding area of the third panel 7, but it is not limited thereto. The third alignment mark 9 may also be disposed at other locations on the third panel 7. In one embodiment, at least part of the third bonding area 74 may include a light-transmitting area or a semi-light-transmitting area, so that the detection element 63 (as shown in FIG. 1) may obtain the image of the third alignment mark 9, but it is not limited thereto.

In one embodiment, the first panel 1 includes a first liquid crystal layer (not shown), the second panel 2 includes a second liquid crystal layer (not shown), and the third panel 3 includes a third liquid crystal layer (not shown). The first liquid crystal layer (not shown) of the first panel 1, the second liquid crystal layer (not shown) of the second panel 2, and the third liquid crystal layer (not shown) of the third panel 3, for example, reflect different colors of light, but it is not limited thereto. The first panel 1, the second panel 2 and the third panel 7 may include a liquid crystal layer (not shown), and the liquid crystal of one of the first panel 1, the second panel 2 and the third panel 7 may be used to reflect blue light, the liquid crystal of another one of the first panel 1, the second panel 2 and the third panel 7 may be used to reflect green light, and the liquid crystal of the other one of the first panel 1, the second panel 2 and the third panel 7 may be used to reflect red light, but it is not limited thereto. In one embodiment, the liquid crystal of the first panel 1, the second panel 2 or the third panel 7 may also be used to reflect light of other colors. In one embodiment, the liquid crystal of the first panel 1, the second panel 2 or the third panel 7 may include, for example, cholesteric liquid crystal, but it is not limited thereto. For example, the first panel 1 may include cholesteric liquid crystal that reflects blue light, the second panel 2 may include cholesteric liquid crystal that reflects green light, and the third panel 7 may include cholesteric liquid crystal that reflects red light, but it is not limited thereto.

Next, the arrangement of the first alignment mark 4, the at least one second alignment mark 5 and the third alignment mark 9 will be described.

As shown in FIG. 3B, in one embodiment, one of the at least one second alignment mark 5 may be used to align with the first alignment mark 4 and the third alignment mark 9, and the one of the at least one second alignment mark 5 may be located between the first alignment mark 4 and the third alignment mark 9, while it is not limited thereto. In more detail, the first panel 1 has a first edge 1a, the second panel 2 has a second edge 2a, the third panel 7 has a third edge 7a, and the first edge 1a, the second edge 2a and the third edge 7a correspond to each other, wherein the first alignment mark 4 is provided adjacent to the first edge 1a, the at least one second alignment mark 5 is provided adjacent to the second edge 2a, the third alignment mark 9 is provided adjacent to the third edge 7a, while it is not limited thereto.

As shown in FIG. 3C, in another embodiment, at least one second alignment mark 5 includes multiple second alignment marks 5. One of the multiple second alignment marks 5b is used to align with the first alignment mark 4, and another one of the multiple second alignment marks 5a is used to align with the third alignment mark 9, while it is not limited thereto. In more detail, the first panel 1 has a first edge 1a and a fourth edge 1b. The fourth edge 1b is, for example, opposite to the first edge 1a. The second panel 2 has a second edge 2a and a fifth edge 2b. The fifth edge 2b is, for example, opposite to the second edge 2a. The third panel 7 has a third edge 7a, in which the first edge 1a, the second edge 2a and the third edge 7a correspond to each other, and the fourth edge 1b corresponds to the fifth edge 2b. The first alignment mark 4 is provided adjacent to the fourth edge 1b, the second alignment mark 5a is provided adjacent to the second edge 2a, the second alignment mark 5b is provided adjacent to the fifth edge 2b, and the third alignment mark 9 is provided adjacent to the third edge 7a. The second alignment mark 5b is used to align with the first alignment mark 4, the second alignment mark 5*a* is used to align with the third alignment mark 9, while it is not limited thereto.

In other embodiments (not shown), the first panel 1 has a first edge 1*a* and a fourth edge 1*b*. The fourth edge 1*b* is, for example, adjacent to the first edge 1*a*. The second panel 2 has a second edge 2*a* and a fifth edge 2*b*. The fifth edge 2*b* is, for example, adjacent to the second edge 2*a*. The third panel 7 has a third edge 7*a*, wherein the first edge 1*a*, the second edge 2*a* and the third edge 7*a* correspond to each other, the fourth edge 1*b* corresponds to the fifth edge 2*b*. The first alignment mark 4 is provided adjacent to the fourth edge 1*b*, the second alignment mark 5*a* is provided adjacent to the second edge 2*a*, and the second alignment mark 5*b* is provided adjacent to the fifth edge 2*b*, and the third alignment mark 9 is provided adjacent to the third edge 7*a*. The second alignment mark 5*b* is used to align with the first alignment mark 4, and the second alignment mark 5*a* is used to align with the third alignment mark 9, while it is not limited thereto.

Figure 4A:
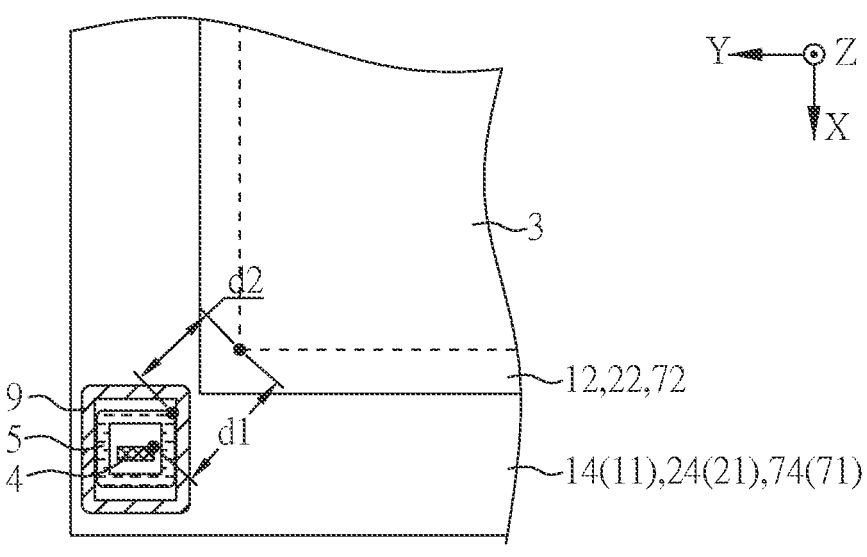
FIG. 4A is a top view of a first alignment mark, a second alignment mark, a third alignment mark and a first adhesive member according to an embodiment of the present disclosure.

Next, the arrangement among the first alignment mark 4, the at least one second alignment mark 5, the third alignment mark 9, the first adhesive member 3 and the second adhesive member 8 will be described. FIG. 4A is a top view of the first alignment mark 4, the at least one second alignment mark 5, the third alignment mark 9 and the first adhesive member 3 according to an embodiment of the present disclosure, FIG. 4B is a top view of the first alignment mark 4, the at least one second alignment mark 5, the third alignment mark 9 and the second adhesive member 8, and please also refer to FIG. 1 to FIG. 3C as a reference.

Figure 4B:
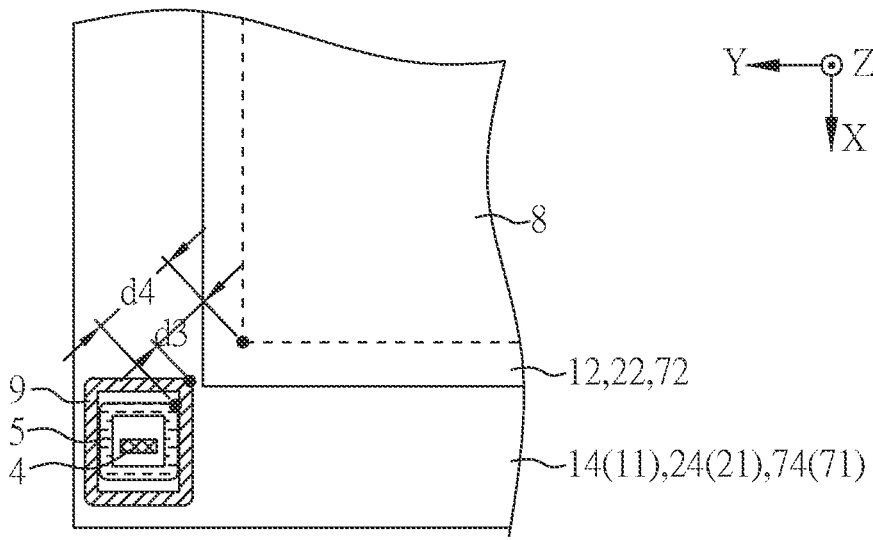
FIG. 4B is a top view of a first alignment mark, a second alignment mark, a third alignment mark and a second adhesive member according to an embodiment of the present disclosure.

As shown in FIGS. 4A and 4B, when the first panel 1, the second panel 2 and the third panel 7 are adhered, the projections of the first bonding area 14, the second bonding area 24 and the third bonding area 74 may at least partially overlap in the Z direction. Furthermore, the projections of the first joining area 14, the second bonding area 24 or the third bonding area 74, and the first adhesive member 3 in the Z direction may not overlap.

As shown in FIG. 4A, in one embodiment, in the direction of overlooking the electronic device 100 (for example, along the Z direction), the first adhesive member 3 and the first alignment mark 4 may be spaced apart by a first distance d1, wherein the first distance d1 may be, for example, the minimum distance between the first adhesive member 3 and the first alignment mark 4, but it is not limited thereto. In the direction of overlooking the electronic device 100 (for example, along the Z direction), the first adhesive member 3 and the at least one second alignment mark 5 may be spaced apart by a second distance d2, wherein the second distance d2 may be, for example, the minimum distance between the first adhesive member 3 and the at least one second alignment mark 5. The first distance d1 is greater than zero, and the second distance d2 is greater than zero (that is, 0<d1, and 0<d2). As a result, in the direction of overlooking the electronic device 100 (for example, along the Z direction), the first adhesive member 3 and the first alignment mark 4 may not overlap, and the first adhesive member 3 and the at least one second alignment mark 5 may not overlap. Therefore, the first adhesive member 3 does not affect the alignment of the first alignment mark 4 and the at least one second alignment mark 5, so as to improve the alignment accuracy.

In one embodiment, in the direction of overlooking the electronic device 100 (for example, along the Z direction), the minimum distance between the first alignment mark 4 and the at least one second alignment mark 5 may be greater than or equal to zero, and the minimum distance between at least one second alignment mark 5 and the third alignment mark 9 may be greater than or equal to zero, but it is not limited thereto. In other embodiments, in the direction of overlooking the electronic device 100 (for example, along the Z direction), the first alignment mark 4 and the at least one second alignment mark 5 may not overlap or may partially overlap, and the at least one second alignment mark 5 and the third alignment mark 9 may not overlap or may partially overlap, while it is not limited thereto.

As shown in FIG. 4B, in one embodiment, in the direction of overlooking the electronic device 100 (for example, along the Z direction), the second adhesive member 8 and the third alignment mark 9 may be spaced apart by a third distance d3, wherein the third distance d3 may be, for example, the minimum distance between the second adhesive member 8 and the third alignment mark 9, but it is not limited thereto. In one embodiment, in the direction of overlooking the electronic device 100 (for example, along the Z direction), the second adhesive member 8 and the at least one second alignment mark 5 may be spaced apart by a fourth distance d4, wherein the fourth distance d4 may be, for example, the minimum distance between the second adhesive member 8 and the at least one second alignment mark 5. In the direction of overlooking the electronic device 100 (for example, along the Z direction), the third distance d3 may be greater than zero, and the fourth distance d4 may be greater than zero (that is, 0<d3, and 0<d4). As a result, in the direction of overlooking the electronic device 100 (for example, along the Z direction), the second adhesive member 8 and the at least one second alignment mark 5 may not overlap, and the second adhesive member 8 and the third alignment mark 9 may not overlap. Therefore, the second adhesive member 8 does not affect the alignment of the at least one second alignment mark 5 and the third alignment mark 9, so as to improve the alignment accuracy.

In one embodiment, in the direction (Z) of overlooking the electronic device 100, the first alignment mark 4, the at least one second alignment mark 5 and the third alignment mark 9 may not overlap, but it is not limited thereto.

Figure 5A:
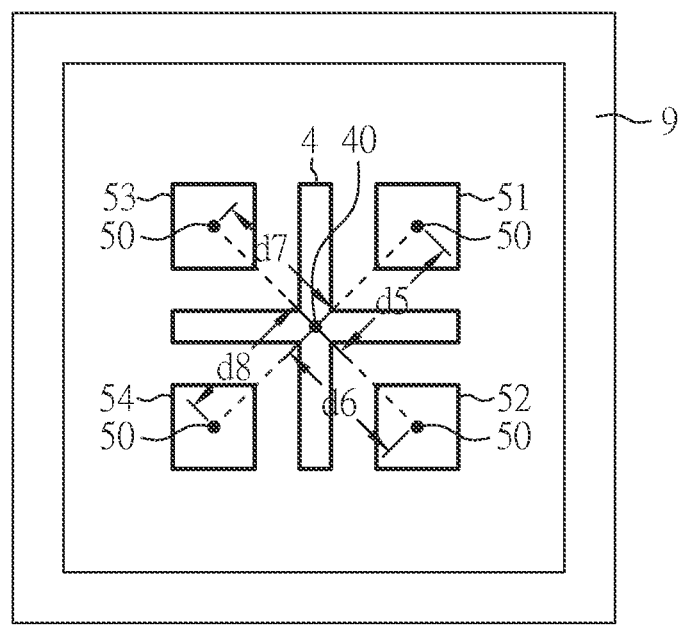
FIG. 5A is a detailed schematic diagram of a first alignment mark, a second alignment mark and a third alignment mark according to an embodiment of the present disclosure.

Next, various implementation aspects of the first alignment mark 4, the at least one second alignment mark 5 and the third alignment mark 9 will be described. FIG. 5A is a detailed schematic diagram of the first alignment mark 4, the at least one second alignment mark 5 and the third alignment mark 9 according to an embodiment of the present disclosure, and please refer to FIG. 1 to FIG. 4B as a reference.

As shown in FIG. 5A, the first alignment mark 4, the at least one second alignment mark 5 and the third alignment mark 9 may be in various patterns. When aligning the first alignment mark 4, the at least one second alignment mark 5 and/or the third alignment mark 9, in the Z direction, one of the first alignment mark 4, the at least one second alignment mark 5 and the third alignment mark 9 may be disposed between the other two; for example, the at least one second alignment mark 5 may be disposed between the first alignment mark 4 and the third alignment mark 9. In other words, the projection of at least one second alignment mark 5 in the Z direction is closer to the projection of the first alignment mark 4 in the Z direction than the projection of the third alignment mark 9 in the Z direction, but it is not limited thereto.

In addition, as shown in FIG. 5A, in the direction of overlooking the electronic device 100 (for example, along the Z direction), the first alignment mark 4 has a center 40, the at least one second alignment mark 5 includes multiple sub-parts 51~54, and each of the multiple sub-parts 51~54 of the at least one second alignment mark 5 has a center 50. In the direction of overlooking the electronic device 100 (for example, along the Z direction), the minimum distance between the center 50 of the sub-part 51 of the at least one second alignment mark 5 and the center 40 of the first alignment mark 4 is defined as a fifth distance d5. In the direction of overlooking the electronic device 100 (for example, along the Z direction), the minimum distance between the center 50 of the sub-part 52 of the at least one second alignment mark 5 and the center 40 of the first alignment mark 4 is defined as a sixth distance d6. In the direction of overlooking the electronic device 100 (for example, along the Z direction), the minimum distance between the center 50 of the sub-part 53 of the at least one second alignment mark 5 and the center 40 of the first alignment mark 4 is defined as a seventh distance d7. In the direction of overlooking the electronic device 100 (for example, along the Z direction), the minimum distance between the center 50 of the sub-part 54 of at least one second alignment mark 5 and the center 40 of the first alignment mark 4 is defined as an eighth distance d8. In one embodiment, the fifth distance d5, the sixth distance d6, the seventh distance d7 and/or the eighth distance d8 are each, for example, between 50 micrometers (um) and 1000 micrometers (um) (50 um≤d5 (or d6, d7, d8)≤1000 um), between 100 micrometers (um) and 800 micrometers (um) (100 um≤d5 (or d6, d7, d8)≤800 um), between 100 micrometers (um) and 700 micrometers (um) (100 um d5 (or d6, d7, d8)≤700 um), between 150 micrometers (um) and 500 micrometers (um) (150 um≤d5 (or d6, d7, d8)≤500 um) or between 250 micrometers and 350 micrometers (250 um≤d5 (or d6, d7, d8)≤350 um), but it is not limited thereto.

In one embodiment, the third alignment mark 9 surrounds the periphery of the first alignment mark 4 and/or the at least one second alignment mark 5, for example, but it is not limited thereto. In one embodiment (not shown), the third alignment mark 9 may also be divided into multiple sub-parts, and the multiple sub-parts are, for example, disposed adjacent to the first alignment mark 4 and/or the at least one second alignment mark 5, while it is not limited the to this.

In one embodiment, the difference between any two of the fifth distance d5, the sixth distance d6, the seventh distance d7 and the eighth distance d8 is smaller than or equal to 50 micrometers, 45 micrometers, 40 micrometers, 35 micrometers, 30 micrometers, 25 micrometers, 20 micrometers, 15 micrometers or 10 micrometers, but it is not limited thereto. For example, the difference between the fifth distance d5 and the sixth distance d6 is smaller than or equal to 50 micrometers (|d5-d6|≤50 um (or other ranges mentioned above)), the difference between the sixth distance d6 and the seventh distance d7 is smaller than or equal to 50 micrometers (|d6-d7|≤50 um (or other ranges mentioned above)), and so on. In other words, the difference in the distances (for example, d5, d6, d7, d8) between the respective centers 50 of the multiple sub-parts (for example, 51~54) of the at least one second alignment mark 5 and the center 40 of the first alignment mark 4 is smaller than or equal to 50 micrometers, 45 micrometers, 40 micrometers, 35 micrometers, 30 micrometers, 25 micrometers, 20 micrometers, 15 micrometers or 10 micrometers (um), while it is not limited thereto.

As a result, the alignment accuracy between the first panel 1 and the second panel 2 may be smaller than or equal to 50 micrometers (or other ranges mentioned above), while it is not limited thereto.

Figure 5B:
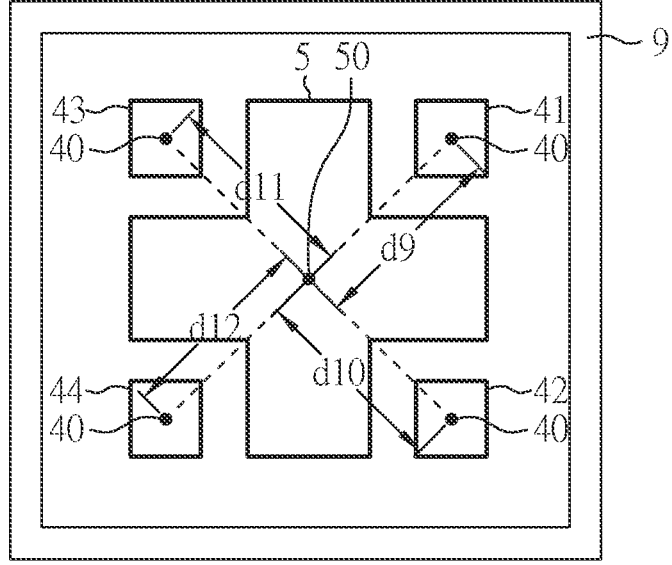
FIG. 5B is a detailed schematic diagram of a first alignment mark, a second alignment mark and a third alignment mark according to another embodiment of the present disclosure.

Next, another implementation aspect of the first alignment mark 4, the at least one second alignment mark 5 and the third alignment mark 9 will be described. FIG. 5B is a detailed schematic diagram of the first alignment mark 4, the at least one second alignment mark 5 and the third alignment mark 9 according to another embodiment of the present disclosure, and please refer to FIG. 1 to FIG. 5A as a reference.

As shown in FIG. 5B, when aligning the first alignment mark 4, the at least one second alignment mark 5 and the third alignment mark 9, in the Z direction, the first alignment mark 4 may be disposed between the at least one second alignment mark 5 and the third alignment mark 9, that is, the projection of the first alignment mark 4 in the Z direction is closer to the projection of the at least one second alignment mark 5 in the Z direction than the projection of the third alignment mark 9 in the Z direction, but it is not limited thereto.

As shown in FIG. 5B, in the direction of overlooking the electronic device 100 (for example, along the Z direction), at least one second alignment mark 5 has a center 50. In the direction of overlooking the electronic device 100 (for example, along the Z direction), the first alignment mark 4 includes multiple sub-parts 41~44 (for example, 4 sub-parts, but not limited to this), and each of the multiple sub-parts 41~44 of the first alignment mark 4 has a center 40. In the direction of overlooking the electronic device 100 (for example, along the Z direction), the minimum distance between the center 40 of the sub-part 41 of the first alignment mark 4 and the center 50 of the at least one second alignment mark 5 is defined as a ninth distance d9. In the direction of overlooking the electronic device 100 (for example, along the Z direction), the minimum distance between the center 40 of the sub-part 42 of the first alignment mark 4 and the center 50 of the at least one second alignment mark 5 is defined as a tenth distance d10. In the direction of overlooking the electronic device 100 (for example, along the Z direction), the minimum distance between the center 40 of the sub-part 43 of the first alignment mark 4 and the center 50 of the at least one second alignment mark 5 is defined as an eleventh distance d11. In the direction of overlooking the electronic device 100 (for example, along the Z direction), the minimum distance between the center 40 of the sub-part 44 of the first alignment mark 4 and the center 50 of the at least one second alignment mark 5 is defined as a twelfth distance d12. In one embodiment, the ninth distance d9, the tenth distance d10, the eleventh distance d11 and/or the twelfth distance d12 may each be, for example, between 50 micrometers (um) and 1000 micrometers (um) (50 um≤d9 (or d10, d11, d12) ≤1000 um), between 100 micrometers (um) and 800 micrometers (um) (100 um≤d9 (or d10, d11, d12)≤800 um), between 100 micrometers (um) and 700 micrometers (um) (100 um≤d9 (or d10, d11, d12)≤700 um), between 150 micrometers (um) and 500 micrometers (um) (150 um≤d9 (or d10, d11, d12)≤500 um) or between 250 micrometers and 350 micrometers (250 um≤d9 (or d10, d11, d12)≤350 um), but it is not limited thereto. In one embodiment, the third alignment mark 9 may, for example, surround the periphery of the first alignment mark 4 and/or the at least one second alignment mark 5, while it is not limited thereto. In one embodiment (not shown), the third alignment mark 9 may also include multiple sub-parts, and the multiple sub-parts may be disposed, for example, adjacent to the first alignment mark 4 and/or the at least one second alignment mark 5, for example, while it is not limited thereto.

In one embodiment, the difference between any two of the ninth distance d9, the tenth distance d10, the eleventh distance d11, and the twelfth distance d12 is smaller than or equal to 50 micrometers, 45 micrometers, 40 micrometers, 35 micrometers, 30 micrometers, 25 micrometers, 20 micrometers, 15 micrometers or 10 micrometers, but it is not limited thereto. For example, the difference between the ninth distance d9 and the tenth distance d10 is smaller than or equal to 50 micrometers (|d9-d10|≤50 um (or other ranges mentioned above)), the difference between the tenth distance d10 and the eleventh distance d11 is smaller than or equal to 50 micrometers (|d10-d11|≤50 um (or other ranges mentioned above)), and so on. In other words, the first alignment mark 4 includes multiple sub-parts (for example, sub-parts 41~44), and the difference in the distances (for example, d9, d10, d11, d12) between the respective centers 40 of the multiple sub-parts (for example, sub-parts 41~44) of the at least one first alignment mark 4 and the center 50 of the at least one second alignment mark 5 is smaller than or equal to 50 micrometers, 45 micrometers, 40 micrometers, 35 micrometers, 30 micrometers, 25 micrometers, 20 micrometers, 15 micrometers or 10 micrometers (um), while it is not limited thereto.

As a result, the alignment accuracy between the first panel 1 and the second panel 2 may be smaller than or equal to 50 micrometers (or other ranges mentioned above), while it is not limited thereto.

It is noted that, although FIGS. 5A and 5B show that the first alignment mark 4 is disposed between the at least one second alignment mark 5 and the third alignment mark 9 as an example, or the at least one second alignment mark 5 is disposed between the first alignment mark 4 and the third alignment mark 9 as another example, the third alignment mark 9 may also be disposed between the first alignment mark 4 and the at least one second alignment mark 5 in actual application, while the shape of the first alignment mark 4, the second alignment mark 5 and the third alignment mark 9 or the number of sub-parts included may be changed according to the needs.

Figure 6A:
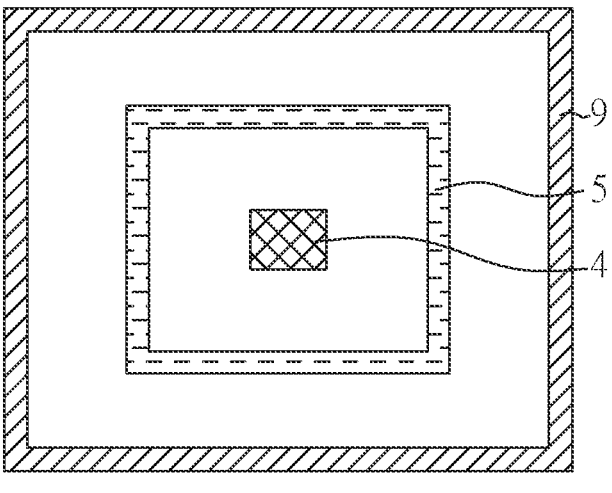
FIG. 6A is a detailed schematic diagram of a first alignment mark, a second alignment mark and a third alignment mark according to another embodiment of the present disclosure.

Next, another implementation aspect of the first alignment mark 4, the at least one second alignment mark 5 and the third alignment mark 9 will be described. FIG. 6A is a detailed schematic diagram of the first alignment mark 4, the at least one second alignment mark 5 and the third alignment mark 9 according to another embodiment of the present disclosure, and please refer to FIG. 1 to FIG. 5B as a reference.

As shown in FIG. 6A, the first alignment mark 4, the at least one second alignment mark 5 and the third alignment mark 9 have different sizes and surround each other in sequence, but it is not limited thereto. For example, the at least one second alignment mark 5 is provided between the first alignment mark 4 and the third alignment mark 9, but it is not limited thereto.

In one embodiment, the first alignment mark 4, the at least one second alignment mark 5 or the third alignment mark 9 may be a ring structure, while it is not limited thereto. In one embodiment, the first alignment mark 4, the at least one second alignment mark 5 or the third alignment mark 9 may be rectangular, square, circular, oval or other suitable shapes (cross-shaped), while it is not limited thereto. In one embodiment, the first alignment mark 4, the at least one second alignment mark 5 and/or the third alignment mark 9 may have the same shape or different shapes, for example, all of which may be rectangular, or part of which may be rectangular and part of which may be circular, while it is not limited thereto. In one embodiment, the first alignment mark 4, the at least one second alignment mark 5 and/or the third alignment mark 9 may, for example, include non-transparent materials, such as metal materials, colored materials (black or other suitable colored material such as photoresist material) or a combination thereof. In one embodiment, the first alignment mark 4, the at least one second alignment mark 5 or the third alignment mark 9 may, for example, include a single layer or a multi-layer material.

Figure 6B:
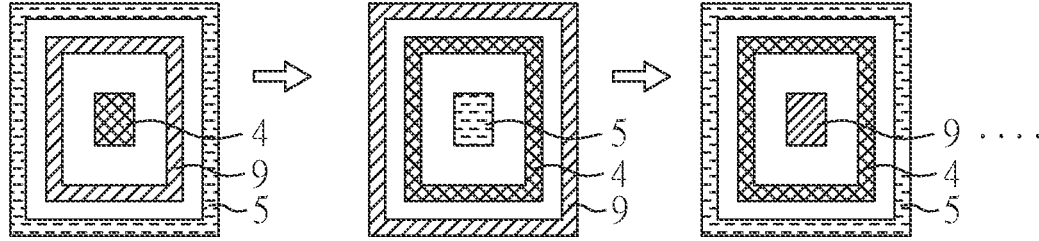
FIG. 6B is a detailed schematic diagram of a first alignment mark, a second alignment mark and a third alignment mark according to another embodiment of the present disclosure.

FIG. 6B is a detailed schematic diagram of the first alignment mark 4, the at least one second alignment mark 5 and the third alignment mark 9 according to another embodiment of the present disclosure, and please refer to FIG. 1 to FIG. 6A as a reference. The description of the embodiment of FIG. 6A may be applicable to some features of the embodiment of FIG. 6B, and thus only the differences will be mainly described below.

As shown in FIG. 6B, the relative size among the first alignment mark 4 on the first panel 1, the at least one second alignment mark 5 on the second panel 2, and the third alignment mark 9 on the third panel 7 may be adjusted arbitrarily according to the needs, so that the first alignment mark 4, the at least one second alignment mark 5 or the third alignment mark 9 may be disposed between the other two, and the first alignment mark 4, the at least one second alignment mark 5 or the third alignment mark 9 may be the largest, second largest or smallest one among the three, while it is not limited thereto. Through the pattern matching of the first alignment mark 4, the at least one second alignment mark 5 and the third alignment mark 9, it is able to perform an accurate alignment, which is beneficial to adhere the first panel 1, the second panel 2 and the third panel 7.

Figure 7:
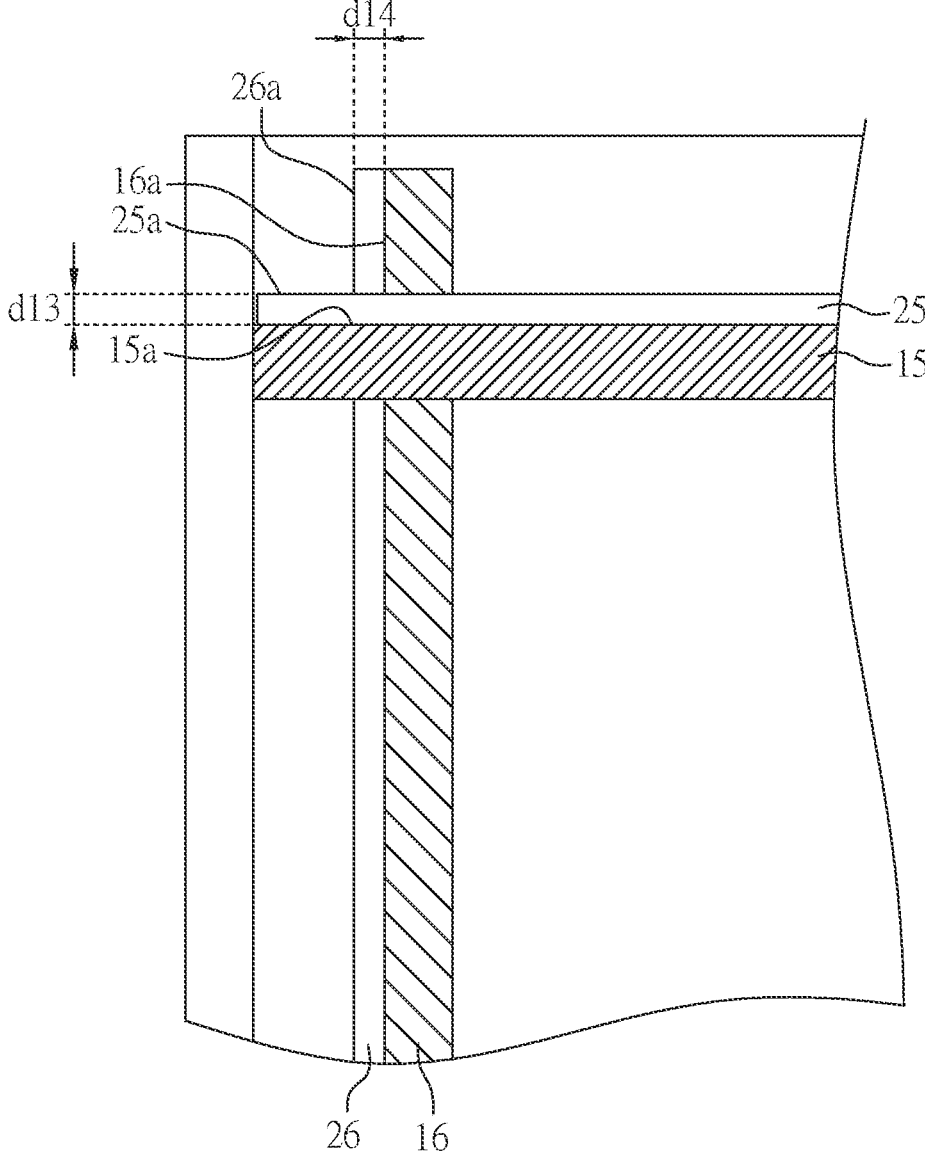
FIG. 7 is a perspective view of an electronic device according to an embodiment of the present disclosure.

The electronic device 100 of the present disclosure may also have other features. FIG. 7 is a perspective view of an electronic device 100 according to an embodiment of the present disclosure, which is presented in a top view direction and shows some internal components of the electronic device 100 in a perspective manner, and please refer to FIG. 1 to FIG. 6B as a reference.

As shown in FIG. 7, in one embodiment, the first panel 1 may have a first scan electrode 15, and the second panel 2 may have a second scan electrode 25. When the first panel 1 and the second panel 2 are adhered, or when the first alignment mark 4 is aligned with the at least one second alignment mark 5, the position of the first scan electrode 15 may correspond to the position of the second scan electrode 25. Furthermore, in the direction of overlooking the electronic device 100, the first scan electrode 15 at least partially overlaps the second scan electrode 25, wherein one side 15a of the first scan electrode 15 corresponds to one side 25a of the second scan electrode 25, and there may be a minimum distance d13 between the side 15a of the first scan electrode 15 and the side 25a of the second scan electrode 25, and the minimum distance d13 may be smaller than or equal to 50 micrometers, 40 micrometers, 30 micrometers, 20 micrometers or 10 micrometers (that is, d13≤50 um (or other ranges mentioned above)), while it is not limited thereto. As a result, the adhering accuracy of the first panel 1 and the second panel 2 may achieve to be smaller than or equal to 50 micrometers, 40 micrometers, 30 micrometers, 20 micrometers or 10 micrometers, but it is not limited thereto.

In one embodiment, the third panel 7 may also have a third scan electrode (not shown), when the second panel 2 and the third panel 7 are adhered, or when the at least one second alignment mark 5 is aligned with the third alignment mark 9, the position of the second scan electrode 15 may also correspond to the position of the third scan electrode (not shown), and the arranged of the aforementioned minimum distance d13 may also be applicable the two electrodes, but it is not limited thereto. Therefore, the adhering accuracy of the second panel 2 and the third panel 7 may achieve to be smaller than or equal to 50 micrometers, 40 micrometers, 30 micrometers, 20 micrometers or 10 micrometers, but it is not limited thereto.

Please refer to FIG. 7 again. In one embodiment, the first panel 1 may have a first data electrode 16, and the second panel 2 may have a second data electrode 26. When the first panel 1 and the second panel 2 are attached, or when the first alignment mark 4 is aligned with the at least one second alignment mark 5, the position of the first data electrode 16 may correspond to the position of the second data electrode 26. In the direction (Z) of overlooking the electronic device 100, the first data electrode 16 at least partially overlaps the second data electrode 26, wherein one side 16a of the first data electrode 16 corresponds to one side 26a of the second data electrode 26, and there may be a minimum distance d14 between the side 16a of the first data electrode 16 and the side 25a of the second scan electrode 26, and the minimum distance d14 may be smaller than or equal to 50 micrometers, 40 micrometers, 30 micrometers, 20 micrometers, or 10 micrometers (that is, $d14 \leq 50$ um (or other ranges mentioned above)), while it is not limited thereto. Therefore, the adhering accuracy of the first panel 1 and the second panel 2 may achieve to be smaller than or equal to 50 micrometers, 40 micrometers, 30 micrometers, 20 micrometers or 10 micrometers, but it is not limited thereto.

In one embodiment, the third panel 7 may have a third data electrode (not shown), when the second panel 2 and the third panel 7 are adhered, or when the at least one second alignment mark 5 is aligned with the third alignment mark 9, the position of the second data electrode 16 may correspond to the position of the third data electrode (not shown), and the aforementioned minimum distance d14 may also be applicable to the two electrodes, but it is not limited thereto. Therefore, the adhering accuracy of the second panel 2 and the third panel 7 may achieve to be smaller than or equal to 50 micrometers, 40 micrometers, 30 micrometers, 20 micrometers or 10 micrometers, but it is not limited thereto.

Next, the adhering process of multiple panels of the electronic device 100 will be described. FIGS. 8(a) to 8(e) are schematic diagrams illustrating the flow of a manufacturing method of an electronic device according to an embodiment of the present disclosure, and please refer to FIGS. 1 to 7 as reference.

As shown in FIGS. 8(a) to 8(e), step S81 is executed first, in which a first panel 1 with a first alignment mark 4 is provided to the second carrier platform 62, a second panel with at least one second alignment mark 5 is provided to the first carrier platform 61, and the first alignment mark 4 and the at least one second alignment mark 5 are aligned under a vacuum environment of lower than 700 Pa (or 600 Pa, while it is not limited thereto). Then, step S82 is executed, in which the first panel 1 and the second panel 2 are adhered together through the first adhesive member 3. Then, step S83 is executed, in which the first panel 1 is released from the second carrier platform 62. Then, step S84 is executed, in which the first panel 1 and the second panel 2 that are adhered together are provided to the second carrier platform 62, the third panel 7 with the third alignment mark 9 is provided to the first carrier platform 61, and the at least one second alignment mark 5 and the third alignment mark 9 are aligned under a vacuum environment of lower than 700 Pa. Then, step S85 is executed, in which the second panel 2 and the third panel 7 are adhered together through the second adhesive member 8 under a vacuum environment of lower than 700 Pa (or 600 Pa, while it is not limited thereto). As a result, the adhering of the first panel 1, the second panel 2 and the third panel 7 may be completed.

Figures 8A, 8B, 8C, 8D, 8E:
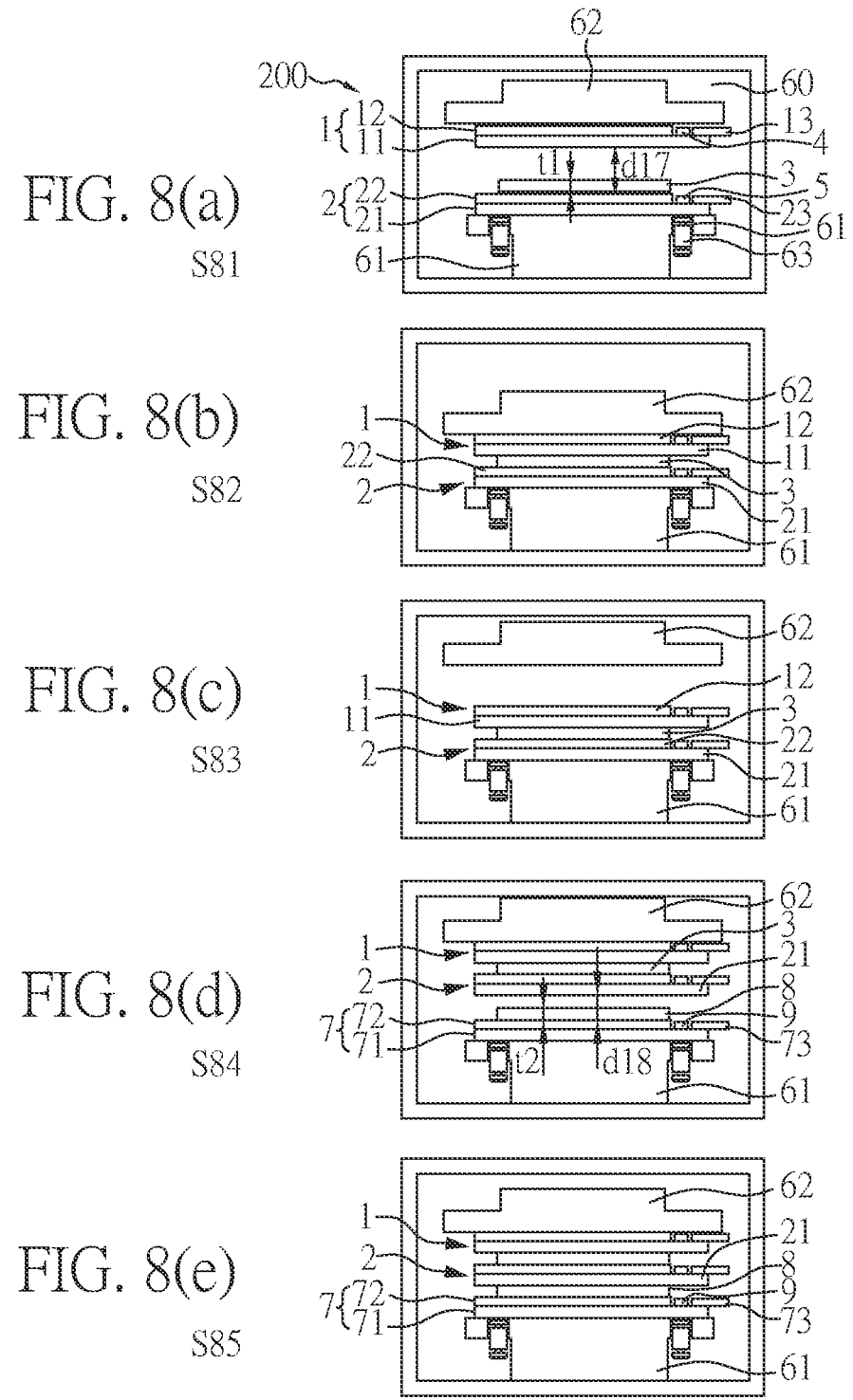
FIGS. 8(a) to 8(e) are schematic diagrams illustrating the flow of a manufacturing method of an electronic device according to an embodiment of the present disclosure.

First, step S81 will be described, which may correspond to FIG. 8(a). In step S81, the first panel 1 and the second panel 2 are provided into the chamber 60 of the assembly apparatus 200, wherein the first carrier platform 61 carrying the second panel 2 is, for example, disposed at the bottom of the chamber 60, and the second carrier platform 62 carrying the first panel 1 is, for example, disposed above the first carrier platform 61, but it is not limited thereto. The first adhesive member 3 may be disposed on the second panel 2 first, for example. In one embodiment, the third substrate 21 of the second panel 2 is disposed on the first carrier platform 61 and adjacent to the first carrier platform 61, the first adhesive member 3 is disposed on the fourth substrate 22 of the second panel 2, the second substrate 12 of the first panel 1 is disposed on the second carrier platform 62 and adjacent to the carrier platform 62, and the first substrate 11 of the first panel 1 faces the first adhesive member 3, for example, but it is not limited thereto. In other embodiments (not shown), the first adhesive member 3 may be disposed on the first panel 1 first, for example. It is noted that the aforementioned arrangement of the first panel 1 and the second panel 2 is only an example and may be adjusted according to the actual needs.

In addition, in the Z direction, there is a minimum distance d17 between the first panel 1 and the second panel 2, which may be, for example, the minimum distance between the second substrate 12 and the first substrate 11, but it is not limited thereto. The first adhesive member 3 has a thickness t1 in the Z direction. The thickness t1 is, for example, the average thickness of the thicknesses taken at any three portions of the first adhesive member 3 in the Z direction. In one embodiment, the minimum distance d17 between the first panel 1 and the second panel 2 is greater than the thickness t1 of the first adhesive member 3 and smaller than or equal to 5 micrometers (that is, $t1 \leq d17 \leq 5$ um), but it is not limited thereto. In one embodiment, the minimum distance d17 is greater than the thickness t1 and smaller than or equal to 4.5 micrometers (that is, $t1 \leq d17 \leq 4.5$ um), but it is not limited thereto. In one embodiment, the minimum distance d17 is greater than the thickness t1 and smaller than or equal to 4 micrometers (that is, $t1 \leq d17 \leq 4$ um), but it is not limited thereto. In one embodiment, the minimum distance d17 is greater than the thickness t1 and smaller than or equal to 3.5 micrometers (that is, $t1 \leq d17 \leq 3.5$ um), but it is not limited thereto. Therefore, it can be ensured that the first alignment mark 4 and the at least one second alignment mark 5 will not be affected by the first adhesive member 3 during alignment, or the alignment accuracy can be improved.

Next, steps S82 and S83 will be described, which may correspond to FIG. 8(b) and FIG. 8(c). In step S82, the second carrier platform 62 carrying the first panel 1 may move toward the first carrier platform 61 so that the first panel 1 and the second panel 2 are adhered together. In step S83, the second carrier platform 62 may be separated from the first panel 1 and returned to a preset position, such as the position of the second carrier platform 62 in FIG. 8(a). In addition, in this example, the first substrate 11 of the first panel 1 being adhered to the fourth substrate 22 of the second panel 2 is taken as an example, but it is not limited thereto. For example, it may also be the first substrate 11 being adhered to the third substrate 21, the second substrates 12 being adhered to the fourth substrate 22, or the third substrate 21 being adhered to the second substrates 12.

Next, step S84 will be described, which may correspond to FIG. 8(d). In step S84, a third panel 7 with a third alignment mark 9 is provided. The first carrier platform 61 may carry the third panel 7, and the second carrier platform 62 may carry the first panel 1 and the second panel 2 that have been adhered to each other, and the second adhesive member 8 may be disposed on the third panel 7, but it is not limited thereto. In one embodiment, the fifth substrate 71 of the third panel 7 is disposed on the first carrier platform 61 and adjacent to the first carrier platform 61, the second adhesive member 8 is provided on the sixth substrate 72, the second substrate 12 of the first panel 1 is provided on the first carrier platform 61 and adjacent to the first carrier platform 61, and the third substrate 21 of the second panel 2 faces the second adhesive member 8, but it is not limited thereto. It is noted that the arrangement of the first panel 1, the second panel 2 and the third panel 7 is only an example, and may be adjusted according to the actual needs.

In addition, in the Z direction, there is a minimum distance d18 between the second panel 2 and the third panel 7. In the example of FIG. 8, the minimum distance d18 is, for example, the distance between the sixth substrate 72 and the third substrate 21, but it is not limited thereto. The second adhesive member 8 has a thickness t2 in the Z direction. In one embodiment, the minimum distance d18 is greater than the thickness t2. The thickness t2 is, for example, the average thickness of the thicknesses taken at any three portions of the second adhesive member 8 in the Z direction, and the minimum distance d18 is smaller than or equal to 5 micrometers (that is, t$2 \leq$d$18 \leq$5 um), but it is not limited thereto. In one embodiment, the minimum distance d18 is greater than the thickness t2 and smaller than or equal to 4.5 micrometers (that is, t$2 \leq$d$18 \leq$4.5 um), but it is not limited thereto. In one embodiment, the minimum distance d18 is greater than the thickness t2 and smaller than or equal to 4 micrometers (that is, t$2 \leq$d$18 \leq$4 um), but it is not limited thereto. In one embodiment, the minimum distance d18 is greater than the thickness t2 and smaller than or equal to 3.5 micrometers (that is, t$2 \leq$d$18 \leq$3.5 um), but it is not limited thereto. Next, step S85 will be described, which may correspond to FIG. 8(*e*). In step S85, the second carrier platform 62 may move toward the first carrier platform 61 so that the first panel 1 and the second panel 2 adhered together are adhered to the third panel 7. Afterwards, the second carrier platform 62 may release the first panel 1 and second panel 2 that are adhered together. In addition, in this example, the third substrate 21 of the second panel 2 being adhered to the sixth substrate 72 of the third panel 7 is taken as an example, but it is not limited thereto.

It is noted that, in steps S81 and S82, the alignment and adhering of the first panel 1 and the second panel 2 may be performed in the same vacuum environment and, in steps S84 and S85, the alignment and adhering of the second panel 2 and the third panel 7 may be performed in the same vacuum environment, thereby ensuring that the panels will not be displaced due to changes in air pressure during adhering. The aforementioned vacuum environment is, for example, a vacuum environment of lower than 700 Pa (or 600 Pa), but it is not limited thereto.

As a result, FIG. 8(*a*) to FIG. 8(*e*) can be understood.

Figures 9A, 9B, 9C, 9D, 9E:
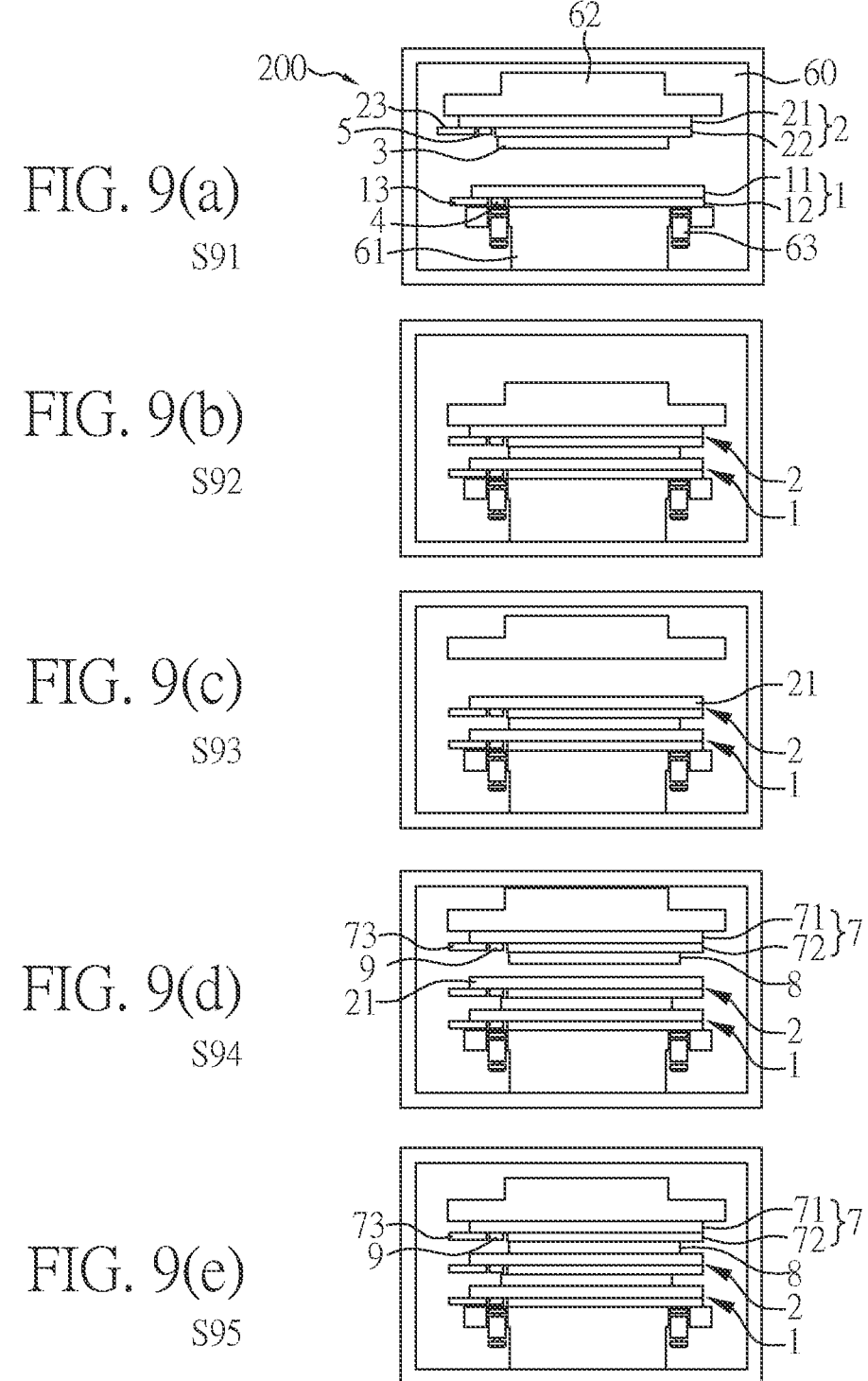
FIGS. 9(a) to 9(e) are schematic diagrams illustrating the flow of a manufacturing method of an electronic device according to another embodiment of the present disclosure.

The adhering process of multiple panels of the electronic device 100 may also have different implementation aspects. FIG. 9(*a*) to FIG. 9(*e*) are schematic diagrams illustrating the flow of a manufacturing method of an electronic device 100 according to another embodiment of the present disclosure, and please refer to FIG. 1 to FIG. 8(*e*) as a reference.

As shown in FIGS. 9(*a*)-9(*e*), step S91 is executed first, in which the first panel 1 with the first alignment mark 4 is provided to the first carrier platform 61, the second panel 2 with the at least one second alignment mark 5 is provided to the second carrier platform 62, and the first alignment mark 4 is aligned with the at least one second alignment mark 5 under a vacuum environment of lower than 700 Pa (or 600 Pa, while it is not limited thereto). Then, step S92 is executed, in which the first panel 1 and the second panel 2 are adhered together through the first adhesive member 3. Then, step S93 is executed to release the second panel 2 from the second carrier platform 62. Then, step S94 is executed, in which the first panel 1 and the second panel 2 adhered together are provided to the first carrier platform 61, the third panel 7 with the third alignment mark 9 is provided to the second carrier platform 62, and the at least one second alignment mark 5 and the third alignment mark 9 are aligned under a vacuum environment of lower than 700 Pa (or 600 Pa, while it not limited thereto). Then, step S95 is executed, in which the second panel 2 and the third panel 7 are adhered together through the second adhesive member 8 under a vacuum environment of lower than 700 Pa (or 600 Pa, while it is not limited thereto). As a result, the adhering of the first panel 1, the second panel 2 and the third panel 7 can be completed.

The description of steps S81 to S85 may be applicable to some features of steps S91 to S95, and thus the following description mainly focuses on the differences.

In step S91 (corresponding to FIG. 9(*a*)), the second substrate 12 of the first panel 1 may be disposed on the first carrier platform 61 and adjacent to the first carrier platform 61, the third substrate 21 of the second panel 2 may be disposed on the second carrier platform 62 and adjacent to the second carrier platform 62, and the first adhesive member 3 may be disposed on the fourth substrate 22 of the second panel 2 and face the first panel 1, but it is not limited thereto. The arrangement of the first panel 1 and the second panel 2 is only an example and may be adjusted according to the actual needs.

In steps S92 and S93 (corresponding to FIGS. 9(*b*) and 9(*c*)), the second carrier platform 62 may move toward the first carrier platform 61, so that the second panel 2 is adhered to the first panel 1. Afterwards, the second carrier platform 62 may release the second panel 2.

In step S94 (corresponding to FIG. 9(*d*)), the fifth substrate 71 of the third panel 7 may be disposed on the second carrier platform 62 and adjacent to the second carrier platform 62, the first panel 1 and the second panel 2 that have been adhered together may be disposed on the first carrier platform 61, the first panel 1 may be adjacent to the first carrier platform 61, and the second adhesive member 8 may be disposed on the sixth substrate 72 of the third panel 7 and face the third substrate 21, but it is not limited thereto. It is noted that the arrangement of the first panel 1, the second panel 2 and the third panel 7 is only an example and may be adjusted according to the actual needs.

In step S95 (corresponding to FIG. 9(*e*)), the second carrier platform 62 moves toward the first carrier platform 61, so that the third panel 7 is adhered to the second panel 2. Afterwards, the second carrier platform 62 may release the third panel 7. Therefore, the adhering of the first panel 1, the second panel 2 and the third panel 7 can be completed. In one embodiment, the first panel 1, the second panel 2 and the third panel 7 are, for example, reflective panels, which are respectively used to reflect light of different colors.

As a result, the display device 1 and its manufacturing method of the present disclosure can be understood.

In one embodiment, the present disclosure may at least compare a product through mechanical observation, such as the presence or absence of components or the operational relationship between components, as an evidence for determining whether the product falls within the patent protection scope of the present disclosure, but it is not limited thereto. In one embodiment, the mechanism observation may be achieved, for example, by using equipment such as an optical microscope or a scanning microscope, but it is not limited thereto.

Details or features of various embodiments of the present disclosure may be mixed and matched as long as they do not violate the spirit of the disclosure or conflict with each other.

Accordingly, the multiple panels of the electronic device of the present disclosure will not be displaced due to changes in air pressure during alignment and adhering. Alternatively, the alignment accuracy of multiple panels of the electronic device of the present disclosure can be improved.

The aforementioned specific embodiments should be interpreted as merely illustrative, and not limiting the rest of the present disclosure in any way, and the features of different embodiments may be mixed and matched as long as they do not conflict with each other.

The invention claimed is:

1. An electronic device, comprising:
a first panel including a first alignment mark;
a second panel disposed on the first panel and provided with at least one second alignment mark;
a first adhesive member disposed between the first panel and the second panel, wherein, in a direction of overlooking the electronic device, the first adhesive member and the first alignment mark are spaced apart by a first distance, and the first adhesive member and the at least one second alignment mark are spaced apart by a second distance, where the first distance is greater than zero, and the second distance is greater than zero;
a third panel disposed on the second panel and provided with a third alignment mark; and
a second adhesive member disposed between the second panel and the third panel;
wherein, in a direction of overlooking the electronic device, the second adhesive member and the third alignment mark are spaced apart by a third distance, and the second adhesive member and the at least one second alignment mark are spaced apart by a fourth distance, where the third distance is greater than zero, and the fourth distance is greater than zero.

2. The electronic device as claimed in claim 1, wherein the at least one second alignment mark is used to align with the first alignment mark and the third alignment mark, and the at least one second alignment mark is disposed between the first alignment mark and the third alignment mark.

3. The electronic device as claimed in claim 1, wherein the at least one second alignment mark includes a plurality of second alignment marks, one of the plurality of second alignment marks is used to align with the first alignment mark, and another one of the plurality of second alignment marks is used to align the third alignment mark.

4. The electronic device as claimed in claim 1, wherein, in a direction of overlooking the electronic device, the at least one second alignment mark includes multiple sub-parts, and a difference in distances between respective centers of the multiple sub-parts of the at least one second alignment mark and a center of the first alignment mark is smaller than or equal to 50 micrometers.

5. The electronic device of claim 1, wherein, in a direction of overlooking the electronic device, the first alignment mark includes a plurality of sub-parts, and a difference in distances between respective centers of the multiple sub-parts of the first alignment mark and a center of the at least one second alignment mark is smaller than or equal to 50 micrometers.

6. The electronic device as claimed in claim 1, wherein the first panel includes a first scan electrode, and the second panel includes a second scan electrode, in which, in a direction of overlooking the electronic device, the first scan electrode at least partially overlaps the second scan electrode, one side of the first scan electrode corresponds to one side of the second scan electrode, and a distance between the side of the first scan electrode and the side of the second scan electrode is smaller than or equal to 50 micrometers.

7. The electronic device as claimed in claim 1, wherein the first panel includes a first data electrode, and the second panel includes a second data electrode, in which, in a direction of overlooking the electronic device, the first data electrode at least partially overlaps the second data electrode, one side of the first data electrode corresponds to one side of the second data electrode, and a distance between the side of the first data electrode and the side of the second data electrode is smaller than or equal to 50 micrometers.

8. The electronic device as claimed in claim 1, wherein the first alignment mark is disposed in a first bonding area of the first panel, and the at least one second alignment mark is disposed in a second bonding area of the second panel.

9. The electronic device as claimed in claim 8, wherein the first panel further includes a first substrate and a second substrate, the first substrate is disposed opposite to the second substrate, and the first alignment mark is disposed on the first substrate and has a projection not overlapping the second substrate in a direction of overlooking the electronic device, and wherein the second panel further includes a third substrate and a fourth substrate, the third substrate is disposed opposite to the fourth substrate, and the at least one second alignment mark is disposed on the third substrate and has a projection not overlapping the fourth substrate in a direction of overlooking the electronic device.

10. The electronic device as claimed in claim 8, wherein the first bonding area and the second bonding area at least partially overlap.

11. The electronic device as claimed in claim 8, wherein at least part of the first bonding area and at least part of the second bonding area include a light-transmitting area or a semi-light-transmitting area.

12. The electronic device as claimed in claim 9, wherein the first bonding area is disposed in an area of the first substrate that does not overlap with the second substrate, and the second bonding area is disposed in an area of the third substrate that does not overlap with the fourth substrate.

13. The electronic device as claimed in claim 1, wherein the third panel further includes a fifth substrate and a sixth substrate, the fifth substrate is disposed opposite to the sixth substrate, the third alignment mark is disposed on the fifth substrate, and the third alignment mark does not overlap the sixth substrate in a direction of overlooking the electronic device.

14. The electronic device as claimed in claim 13, wherein the third alignment mark is disposed in a third bonding area of the third panel, and the third bonding area is located in an area of the fifth substrate that does not overlap the sixth substrate.

15. The electronic device as claimed in claim 1, wherein the first alignment mark, the at least one second alignment mark and the third alignment mark have different sizes and surround each other in sequence.

* * * * *